United States Patent [19]

Fortuna

[11] Patent Number: 4,466,845
[45] Date of Patent: Aug. 21, 1984

[54] METHODS OF MAKING BI-AXIALLY ORIENTED, THIN-WALLED, SYNTHETIC PLASTIC CONTAINERS/ARTICLES

[75] Inventor: Vincent E. Fortuna, Huntington Beach, Calif.

[73] Assignee: Cosden Technology, Inc., Dallas, Tex.

[21] Appl. No.: 190,473

[22] Filed: Sep. 24, 1980

[51] Int. Cl.$^3$ ............... B29C 27/08; B29C 17/04; B32B 1/10

[52] U.S. Cl. .................. 156/73.5; 156/245; 156/292; 264/68; 264/531; 264/532; 264/545; 264/551

[58] Field of Search .......... 264/530, 532, 531, 544, 264/545, 549, 550, 551, 68; 156/73.5, 292, 245

[56] References Cited

U.S. PATENT DOCUMENTS

| | | | |
|---|---|---|---|
| Re. 29,448 | 10/1977 | Brown et al. | 264/68 X |
| 3,184,524 | 5/1965 | Whiteford | |
| 3,499,068 | 3/1970 | Brown | 425/531 X |
| 3,737,494 | 6/1973 | Wolf | 264/549 |
| 3,814,784 | 6/1974 | Wolf | 264/549 |
| 3,900,120 | 8/1975 | Sincock | 428/35 X |
| 4,224,275 | 9/1980 | Sauer | 264/550 X |

FOREIGN PATENT DOCUMENTS 48-8862 3/1973 Japan ................ 264/549

Primary Examiner—Jan Silbaugh
Attorney, Agent, or Firm—Michael J. Caddell; M. Norwood Cheairs; John K. Abokhair

[57] ABSTRACT

A method of, and apparatus for, forming thin-walled synthetic plastic containers and like articles wherein areas are stretched out of the plane of heated thermoplastic material a portion of the axial length of the containers or articles to be formed to form top and bottom preforms, each with an open and a closed end; each preform, while still in the webs, is further axially and radially stretched, at a temperature conducive to orientation of the molecular and crystalline structure of the material, to a greater length still less than the axial length of the container or article to be formed; the preforms are severed from the webs to provide open ended top and bottom sections; and the open ends of pairs of top and bottom preforms are assembled and welded together to form the containers or articles.

10 Claims, 22 Drawing Figures

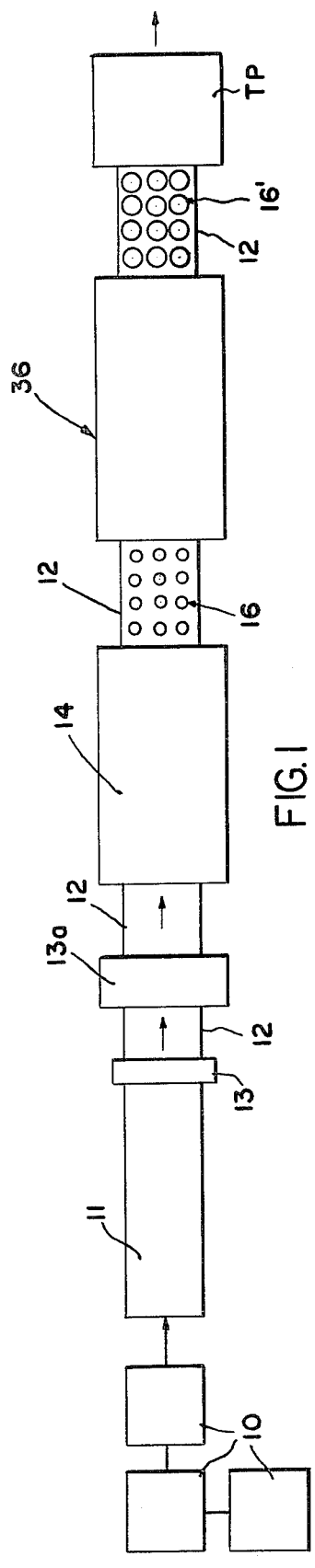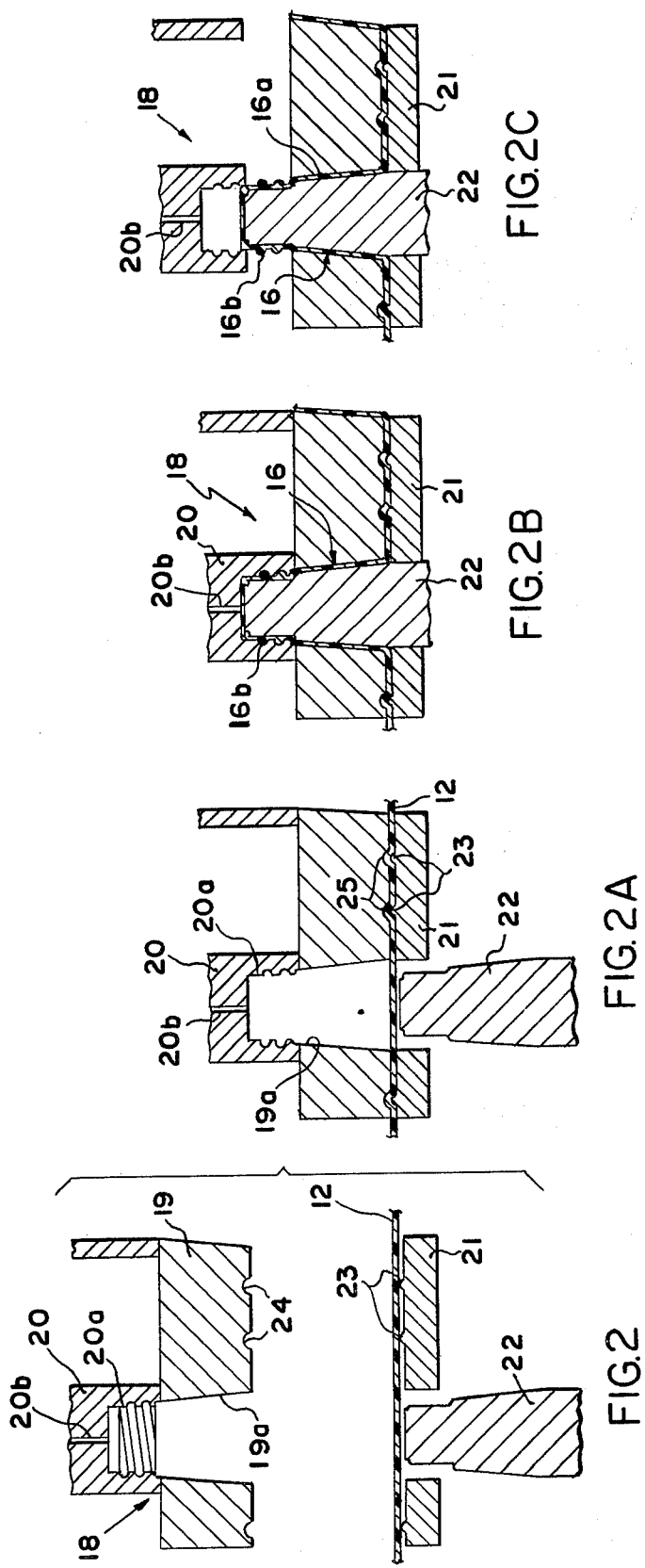

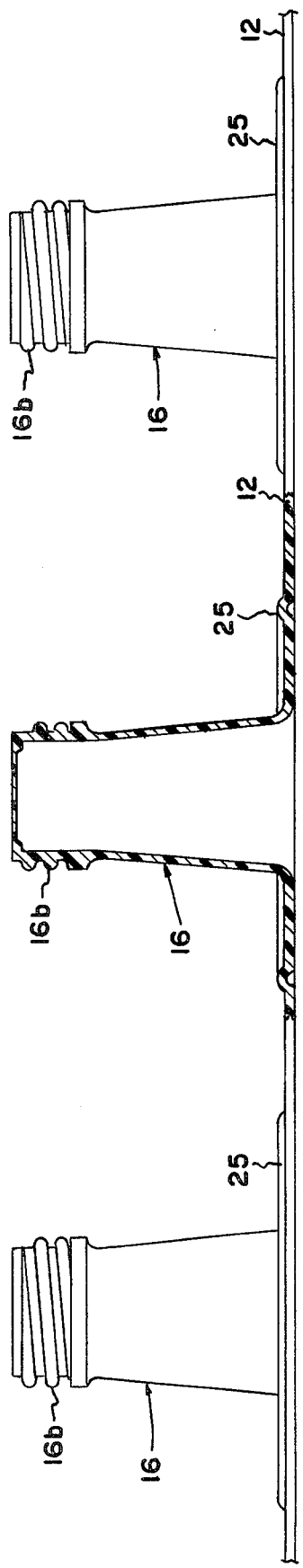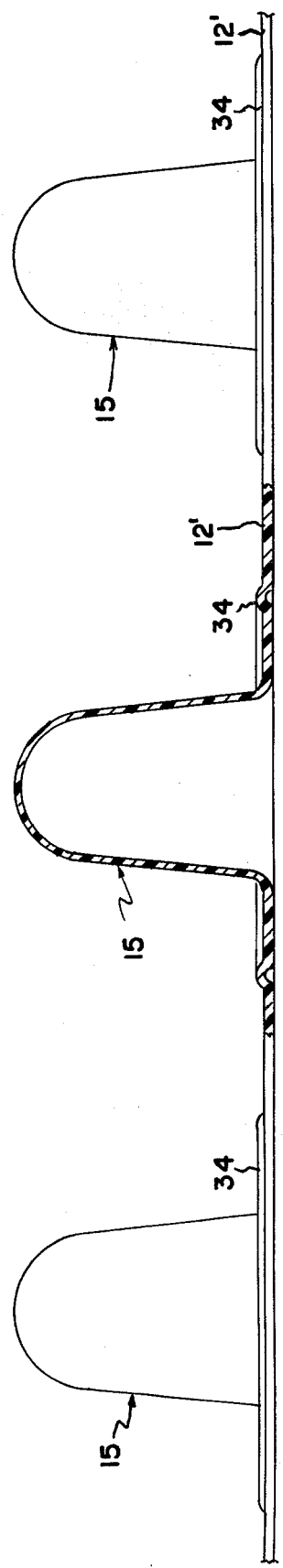

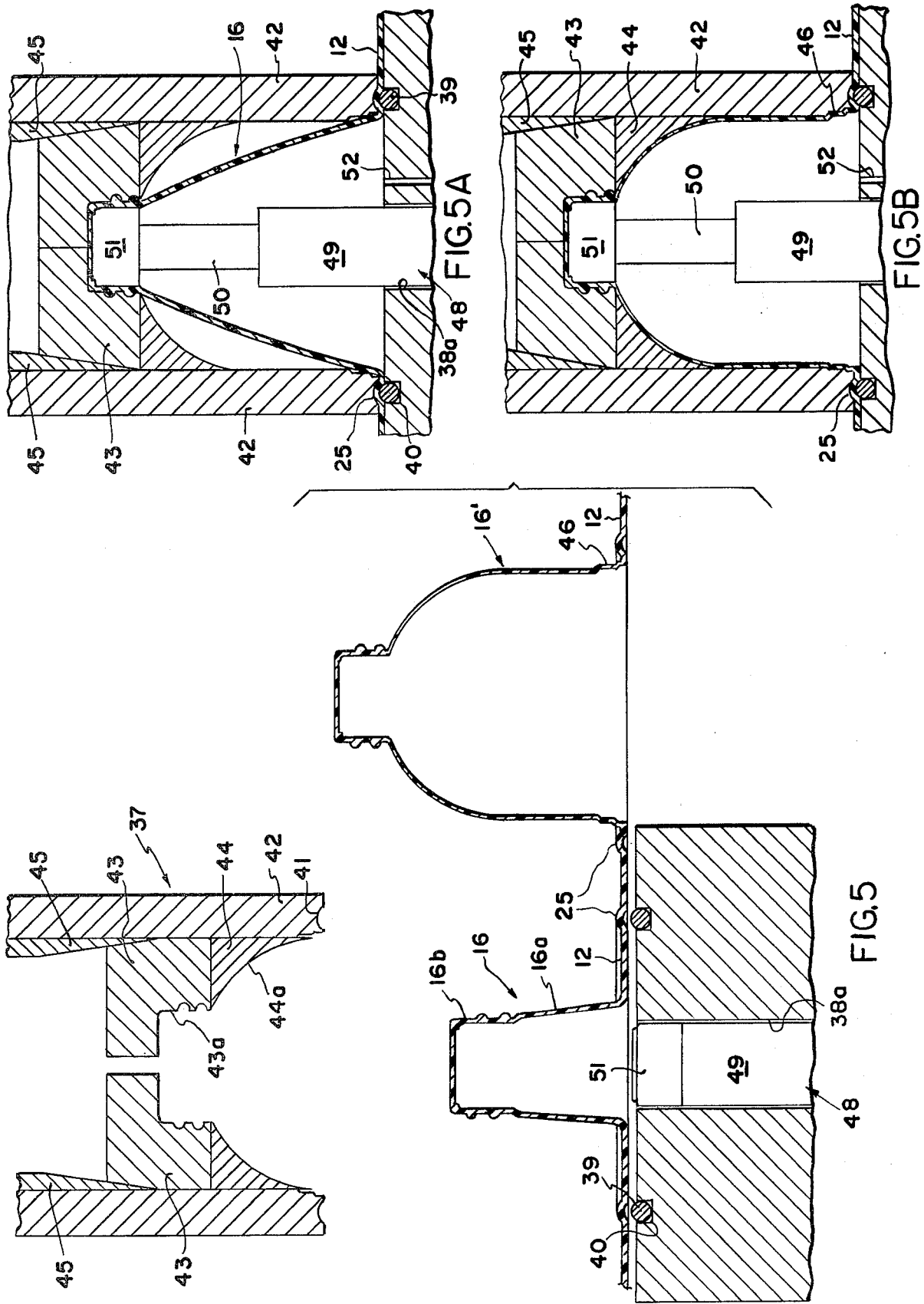

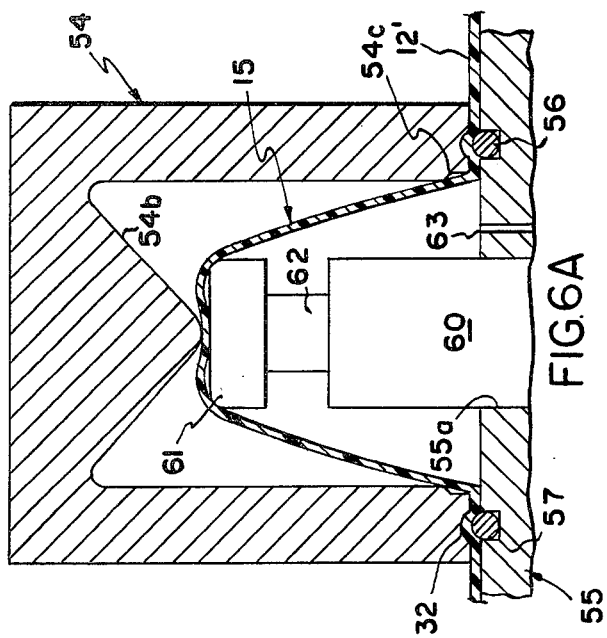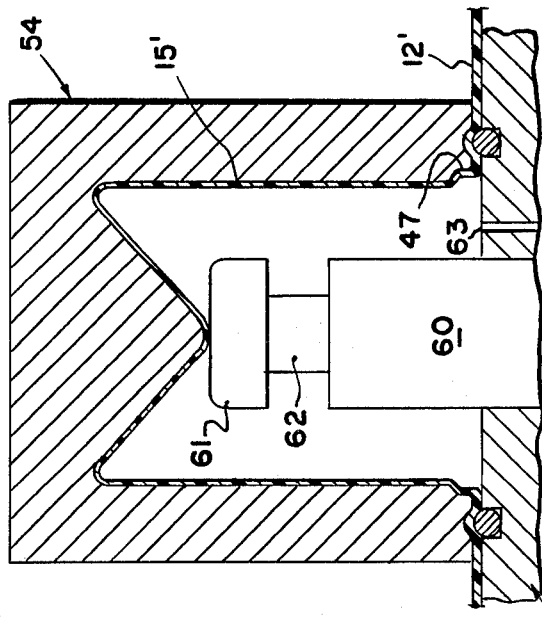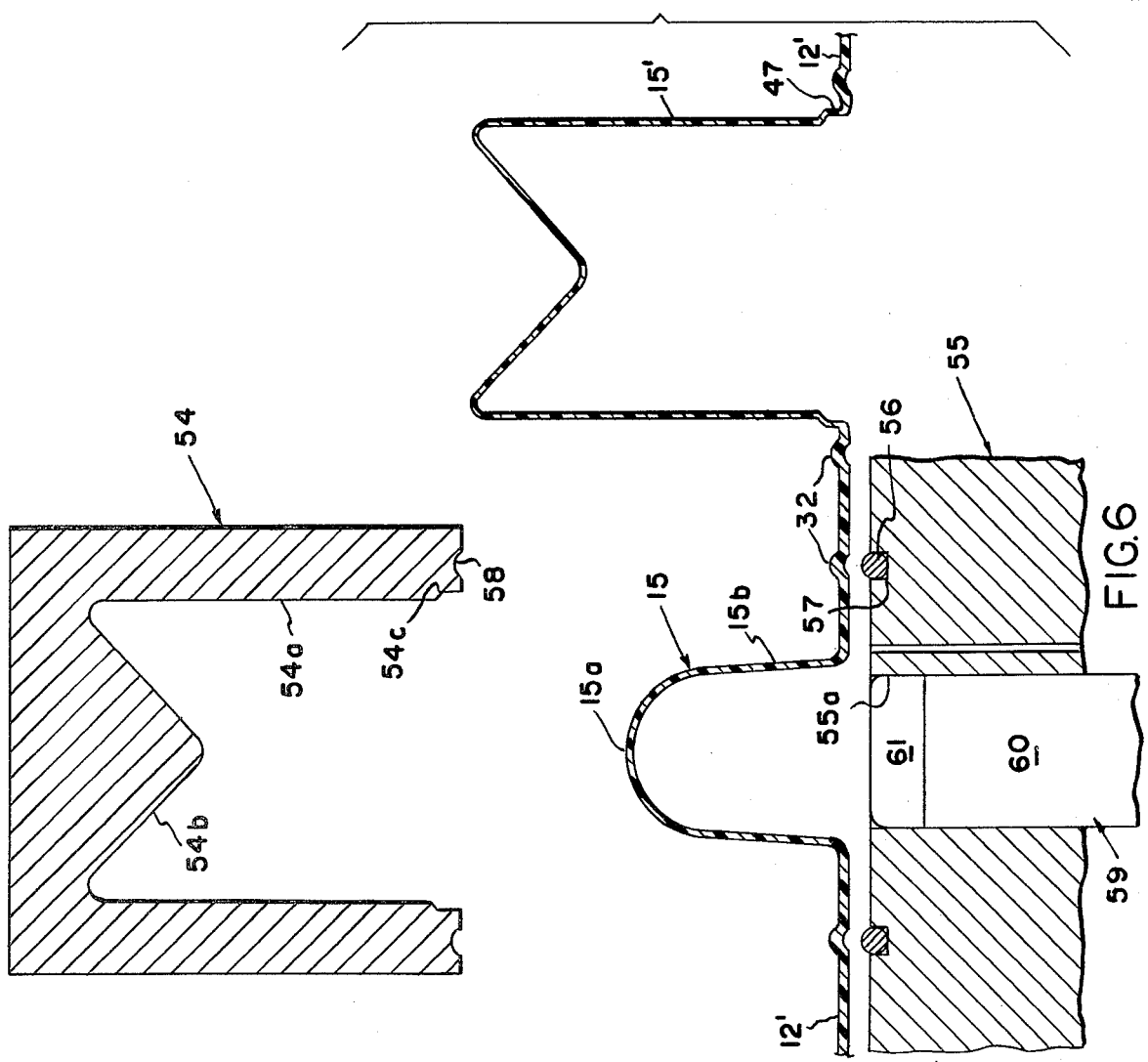

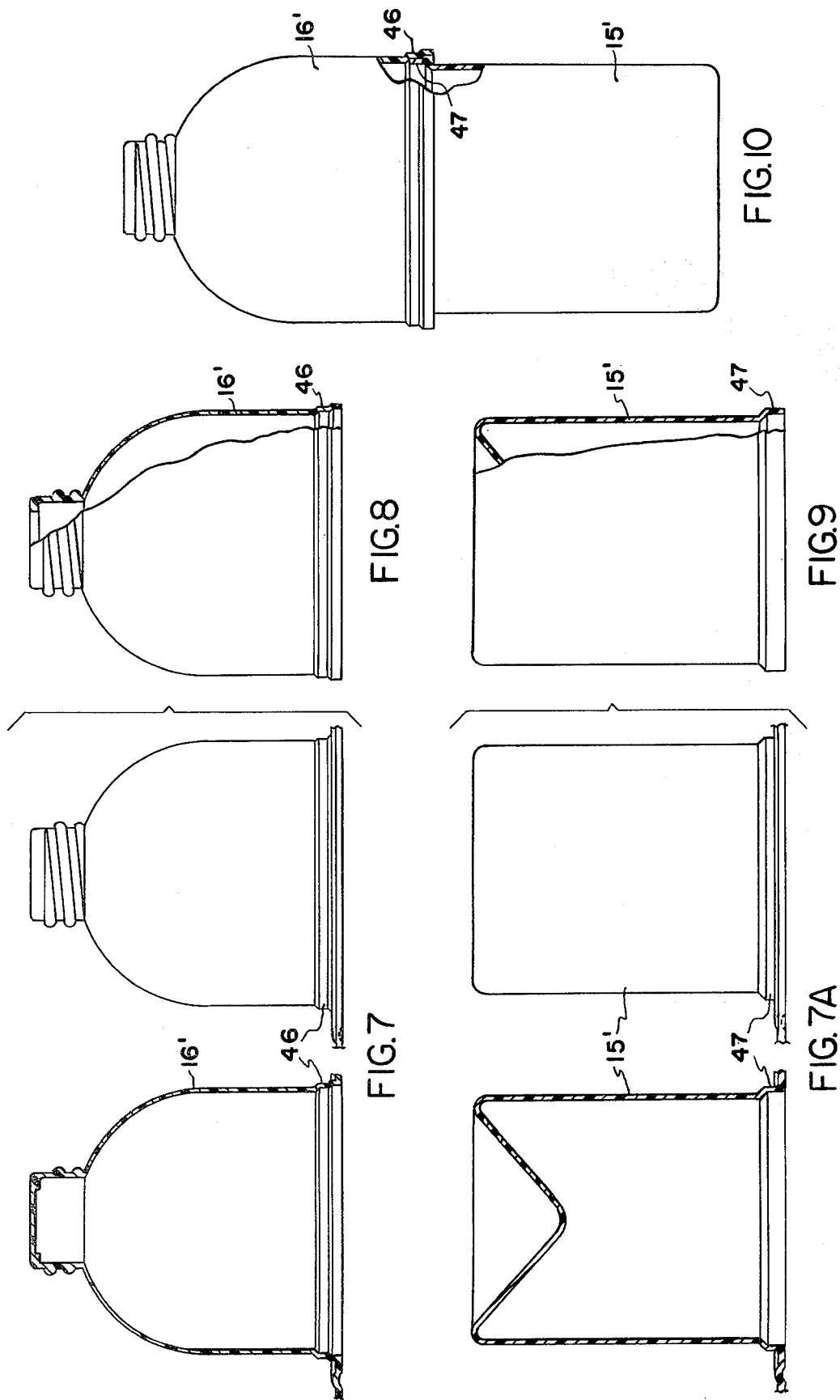

METHODS OF MAKING BI-AXIALLY ORIENTED, THIN-WALLED, SYNTHETIC PLASTIC CONTAINERS/ARTICLES

BACKGROUND OF THE INVENTION

Containers such as bottles and cans for the retention of liquid under pressure of the type used for carbonated beverages, beer, and the like have usually been blow-molded from extruded parisons without much improvement in mechanical strength in the axial direction resulting from orientation due to the fact the article was not significantly axially stretched and the temperature at which stretching occurred was too high. More recently, as set forth in U.S. Pat. No. 3,949,033, there have been proposals to preform an initially freely extruded parison to an intermediate closed bottom parison prior to finally blowing it to the desired physical configuration with air under pressure in the usual manner. In the patent mentioned, another embodiment of the invention uses an injection molded parison instread of an initially extruded parison and in both instances the final step in the process is a mechanical reforming of the closed container bottom to achieve an enhanced bottom strength in the container.

In another U.S. Pat. No. 3,461,503, a container is formed from a parison having a press molded neck by stretching the closed bottom of the parison and then radially blow stretching it while leaving the neck portion of the bottle in its original state, so that the neck portion of the bottle is considerably thicker than the relatively thin-walled body. This process was proposed to overcome a disadvantage heretofore present when widemouth containers were formed with neck portions of inadequate strength and rigidity.

U.S. Pat. No. 3,896,200 is directed to a method of bi-axially orienting a blow-molded article by providing a parison shorted than a mold into which it is placed and stretching the parison axially. Other, usually bi-axially oriented containers are disclosed in U.S. Pat. Nos. 3,170,971, 3,303,249, 3,784,342, 3,865,530, 4,017,250, 4,151,250 and 4,155,697, but in each instance, the containers are formed in one piece and do not have the axial rigidity of containers formed in accordance with the present invention. Where methods of the character disclosed in the aforementioned patents produce some beneficial rigidity and strength characteristics as a result of the bi-axial orientation of the container or bottle, the method which I will disclose provides greatly improved strength and rigidity characteristics in containers which I form of multiple container sections.

One of the prime objects of the invention is to provide a bi-axially oriented bottle or container with enhanced axial strength and rigidity in comparison to bottles or containers being presently formed by known blow-molding technology.

Another object of the invention is to provide a high production rate method of forming such containers which permits making them at considerably greater speeds than formerly, with the economies inherent in increased production per unit of time.

Still a further object of the invention is to provide an improved method of forming containers of the character described, which is extremely reliable in terms of the manufacture of leak-proof containers, while still providing the containers at considerably decreased cost.

SUMMARY OF THE INVENTION

A plurality of top parisons, having neck and open-ended body portions, are differential pressure molded in a heated thermoplastic web of synthetic plastic material at conventional differential pressure or vacuum forming temperatures. Thereafter, the parisons, which cool in the molds, are moved from mold cavities to enlarged orientation cavities after being supplementally heated to a temperature suitable for bi-axial stretch orientation. A second set of bottom parisons are then differential pressure molded in a second heated plastic web at these temperatures and likewise the web is advanced to move the bottom preforms to enlarged orientation cavities. After bi-axial stretching of both sets of parisons at orientation temperatures, the expanded preforms are trimmed for their respective webs. Thereafter, the open ends of the final top and bottom sections are joined to complete the container structure. The side walls of the parisons are pressure forged or squeezed to precondition them for the axial expansion which provides the molecular orientation.

Other objects and advantages of the invention will be pointed out specifically or will become apparent from the following description when it is considered in conjunction with the appended claims and the accompanying drawings.

BRIEF DESCRIPTION OF THE DRAWINGS

FIG. 1 is a schematic view illustrating the steps which are performed in making both sections of the bottles or containers;

FIGS. 2–2C are fragmentary sectional, elevational views which illustrate the manner in which the top parisons are initially differential pressure formed;

FIG. 4 is an enlarged, longitudinal, elevational view which illustrates a web or sheet of plastic in which top parisons have been differential pressure formed;

FIG. 4A is a similar view of a second sheet or plastic web in which the bottom preforms or parisons have been differential pressure formed;

FIG. 5 is a schematic sectional elevational view illustrating an orientation mold structure to which the top preforms are next fed;

FIGS. 5A–5B are transverse, sectional views illustrating the manner of expanding and molecularly orienting the top performs;

FIG. 6 is a sectional elevational view, similar to FIG. 5, and illustrating an orienting mold for the bottom preforms or parisons;

FIGS. 6A–6B are transverse, sectional views illustrating the manner of expanding and molecularly orienting the bottom preforms;

FIG. 7 is an elevational view illustrating top parisons which have been finally expanded to ultimate girth and length;

FIG. 7A is a similar view illustrating bottom parisons expanded to final girth and length;

FIG. 8 is a partly sectional elevational view illustrating a completed top portion which has been severed from the plastic web in which it was formed;

FIG. 9 is a similar view illustrating a completed bottom portion which has been severed from the plastic web in which it was formed; and FIG. 10 is a partly sectional, side elevational view of a typical bottle or container in assembled condition.

Figure 3A:
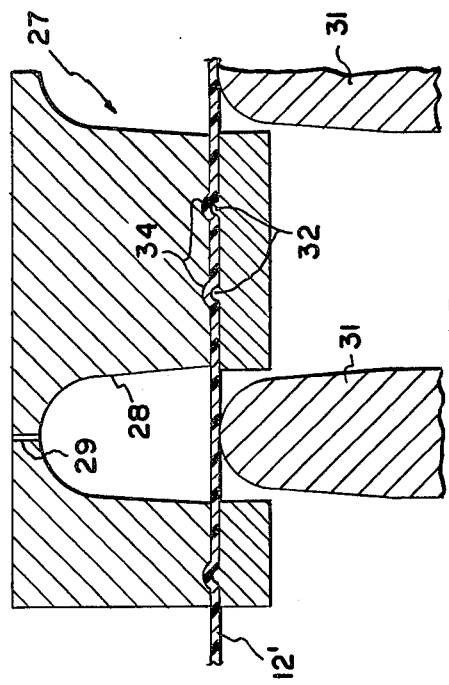
FIGS. 3–3C are similar schematic, sectional elevational views illustrating the manner in which the bottom parisons are initially differential pressure formed.

Referring now more particularly to the accompanying drawings and in the first instance to FIG. 1, a numeral 10 is directed to a hopper-blender-dryer system for feeding the plastic material to a conventional extruder 11, the dryer being of a type which is desicant dehumidifed to provide material which has less than 0.002 percent moisture. The extruder 11 provides a synthetic plastic web 12 which is issued from an extrusion mold orifice at 13, and passes to a chill roll station 13a of conventional design, from which it issues as a stabilized web which has a controlled thickness and width.

Machinery of this character is well-known and commercially available for forming a wide variety of plastic webs which are self-supporting when they pass on to a thermoforming machine 14 which incorporates a suitable heating station for bringing the web to thermoforming temperature before it is advanced to the molds in machine 14. A wide variety of thermoplastic synthetic plastic materials may be processed in the manner to be disclosed, and I mention only several, i.e. polyethylene terephthalate, polystyrene, polyethylene and polypropylene as being typical. Others are polyvinyl chloride, the polycarbonates, the nitriles, and various such co-extruded material such as saran inside polyethylene terephthalate, the saran film interior being of sufficient thickness to function as a vapor barrier even after the axial stretching to be described. A separate processing line of the character disclosed in FIG. 1 is utilized to form each of the container bottom and top preforms 15 and 16, respectively, it being understood that the identical line shown in FIG. 1, with certain differences in mold cavity structure, is used to process the container bottom preforms.

As indicated earlier, the process involves the formation of the initial upper and lower preforms 16 and 15 in respective separate webs 12 and 12' at conventional thermoforming temperatures which may be defined as a solid-phase state in the crystalline melting point range, i.e. just below the crystalline melting point and above the glass transition point. For polypropylene, for example, a thin walled sheet having a thickness less than 3.2 mm. can be 4° to 15° C. below its crystalline melting point (167°-169° C.). For polystyrene, the forming temperature is in the range 170°-180° C., and for polyethylene terephthalate it may be 300°-325° F. It is to be understood that the processing line for the bottom preforms 15 from which the bottom portions of the container are formed is identical to the processing line for the top or upper section preforms from which the upper sections of the bottles or containers are formed, except for those differences in forming mold and orientation mold structure which will be mentioned.

The thermoformer 14, which is employed in the system for forming both the upper and lower preforms 16 and 15, respectively, may be of the character disclosed in Brown U.S. Pat. 3,346,923, which is incorporated herein by reference, and discloses both a typical heating station and a typical molding station with platen mounted molds for accomplishing the thermoforming operation. Such a machine is well suited for in-line operation with an extruder issuing a continuous sheet of plastic material, or with a plastic sheet supplying station which provides the webs of plastic material from a roll.

The molds in the thermoformers in the processing lines for webs 12 and 12', for forming the respective preforms or parisons, differ, and those for forming the bottle top preformed forms 16 in the web 12 are typically illustrated in FIGS. 2-2C. Here the platen mounted upper mold, generally designated 18, is shown as comprising, for each cavity, a body forming portion 19 and a separable, revolvable neck forming portion 20. The portion 19 provides the mold cavity 19a for forming the body portion 16a of preform 16, and the mold 20 has an internally threaded mold cavity 20a for forming the threaded neck 16b of the top preform 16. As shown in FIG. 2, a port 21 which is in communication with a source of vacuum in the usual manner, can be provided in the mold part 20.

The platen mounted lower mold, generally designated 22, is associated with the upper mold in the manner of the patent mentioned, and provides a plug assist member 22 for each mold cavity. In the present instance, the member 22 is more than a plug assist member, however, as FIG. 2B indicates, it is of the same configuration as the mold cavities 19a and 20a, and is of a size to fully squeeze material over the entire internal surface of preform 16 to provide a pressure forging effect, which compresses the molecular and crystalline structure of the material. This controlled squeezing or densifying of the material against the cavity parts 19a and 20a has the effect of mechanically deforming the material and pre-conditioning it for the stretch orientation which is to follow, and will shortly be described in detail. In the pressure forging which is accomplished, when the member 22 is moved to the FIG. 2B position from the position in which it is shown in FIG. 2A, the coarser crystals are kneaded and refined, minute interstices are filled, and layers are consolidated. Essentially, the material typically is compressed about one and one-half to two percent, the member 22 being sized to do this when moved into final position.

A further advantage of processing the material in the manner indicated, is that of achieving uniformity of wall thickness without weak spots after a still further stretching operation to be described. The containers ultimately to be formed are what are known in the trade as thinwalled containers or bottles which typically may, for example, be of ten and twelve ounce size, and have a final axial wall thickness in the range 10 through 25 mils, typically, for instance, a thickness of 12 mils. The webs 12, and also the web 12', will initially have a thickness in the 60 to 70 mil range, when the final axial wall thickness desired in the final product is about 12 mils.

The thicknesses are mentioned only as being illustrative, and are not intended in any way to limit the scope of the invention which is described herein, nor is it to be understood that the invention is in any way limited to the processing of the particular plastics which have been mentioned illustratively. As indicated, the thermoforming temperature will be sufficiently below the crystalline melting point of the material to avoid the strong sag which otherwise would interfere with the forming operation. Of course, the temperatures mentioned are also mentioned only as typical, with the realization that the temperature at the surface of the web will be slightly different than the temperature at the core of the web. The thermoformer 14, of course, has a plurality of molds 18 and 21.

Ring forming protrusions 23 are provided on the lower mold plates 21 to mate with locking recesses 24 provided in the mold portions 19, and these members 23-24 form rings 25 in the plastic webs 12, which, as later will become apparent, function in the orientation step to air-seal the orientation mold cavities.

As FIGS. 2 through 2C particularly indicate, the molds 18 and 21 are first brought to the close FIG. 2A position, and then members 22 are moved axially, as shown in FIG. 2B, to deform and stretch the material in the axial direction at the same time that suction forces via ports 21 are assisting in moving the material up into intimate contact with mold cavities 19a and 20a. As indicated earlier, the members 22 are sized with respect to mold cavities 19a and 20a, and the thickness of the deformed sheet, to achieve this squeezing or forging of the material, and particularly the axial side wall. The dwell period is sufficient for the material to "set" in the chilled molds in this forged state.

Finally, as indicated in FIG. 2C, the mold part 20 can be revolved and raised, mold part 21 being mounted on a suitable ball nut and screw device or the like, in the usual manner. Thence mold members 22 and 21 can be lowered to the FIG. 2 position, and mold 18 raised to the FIG. 2 position, to release the webs 12, which now have the configuration disclosed in FIG. 4.

The bottom preforms (see FIGS. 3-3C) are formed in the webs 12' in much the same manner in a separate system of the character disclosed in FIG. 1. Here the platen mounted upper molds are designated 27, and have mold cavities 28 communicating with a source of vacuum via ports 29, in the usual manner. The lower molds 30 are associated with plug assist members 31, which once again, are sized to squeeze the same material described in the manner indicated in FIG. 3B over the entire cavity 28 surface in the manner previously described. Once again, a molecular and crystalline structure compression on the order of 1½ to 2%, is achieved at the thermoforming temperature.

Figure 3C:
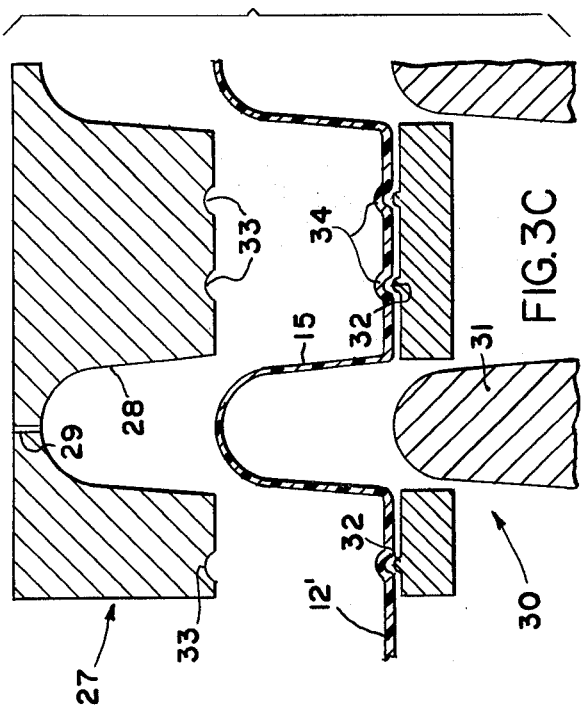
Figure 3:
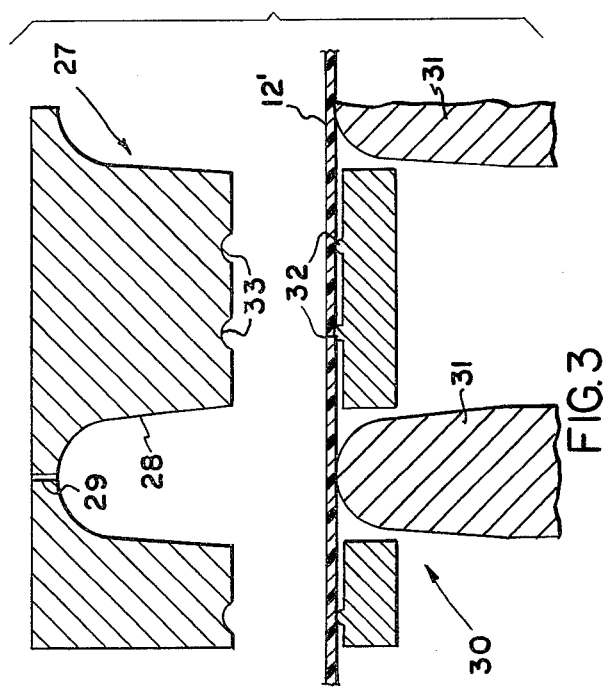
Figure 3B:
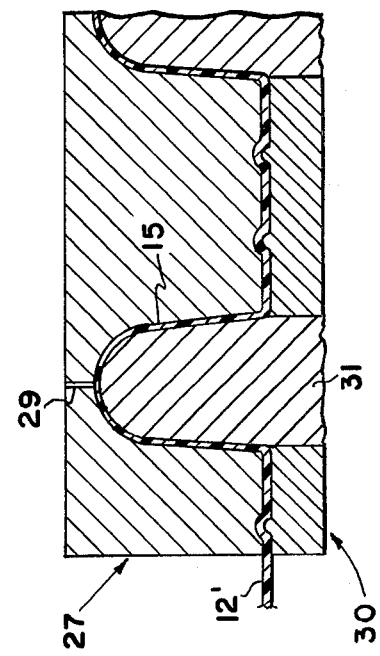

As with web 12, the lower mold 30 has protruding rings 32 around each member 31 cooperating with ring grooves 33 provided in the upper mold 27 to form rings 34 in the plastic web 12'. The container lower preforms 16 are formed as illustrated in FIGS. 3-3C, with molds 27 and 30 first being brought into locked relation as shown in FIG. 3A. Thence members 31 are moved up into cavities 28 to achieve the squeezing and preconditioning of the preformed parisons. The chilled mold parts, of course, cause the plastic to set in the preconditioned state, as previously. Finally, as indicated in FIG. 3C, upon withdrawal of members 31, mold 30 can be lowered and mold 27 raised to free the web 12' for advancement to the next processing station, the web 12', at this point, having the configuration disclosed in FIG. 4A.

From the thermoformer 14 in each system, the plastic web 12 or 12' proceeds to an orientation station, generally designated 36 which may consist essentially of the thermoformer structure described in the aforementioned Brown patent. In this second thermoformer, which functions as an orientation station, each preform 16 in web 12 is final-formed. Likewise, in a system which processes web 12', the preforms 15 are final-formed. FIGS. 5-5B illustrate the platen mounted mold structure which is provided for final-forming and orienting the container top sections 16' and FIGS. 6-6B depict the mold structure for final-forming and orienting the final bottom sections 15'. It is to be understood that each of the final-forming processing structures 36 also includes a heating station which may be of the character disclosed in the aforementioned Brown patent, or may comprise a hot air flow heating system of conventional design to bring the plastic webs 12 and 12' which have been chilled in molds 18-21 and 27-30, respectively, to an orienting temperature.

The unit 36 for expanding a container top preform 16 (see FIGS. 5-5B),includes upper and lower platen-mounted molds, generally designated 37 and 38, which respectively orient a plurality of preforms simultaneously. The upper mold 37 carries a plurality of mold piece mounting sleeves 42 in fixed position and the lower mold 38 has openings 38a associated with a plurality of plug assist members 48. Around each member 48, the lower mold 38 carries a rubber seal ring 39, in a groove 40 which is vertically aligned with an annular groove 41 provided in the mating sleeve 42. Each sleeve 42 mounts the split mold pieces 43 and 44 which provide the upper mold cavity portions 43a and 44a.

The web or sheet 12 is indexed to the position shown in FIG. 5 in which the projection rings 25 are vertically aligned with the seal rings 39 and grooves 41 so that, when the upper and lower molds are moved to closed position, as shown in FIG. 5a, a leak-proof lock seal is provided. Provided in the usual manner to move the split mold parts 43 and 44 from the spread-apart FIG. 5 position to the closed position illustrated in FIG. 5A, are the usual wedge fingers 45 which move downwardly relative to sleeves 42 to axially compress the parts 43 and 44. Partible molds are well-known in the blow-molding industry and also in differential plastic forming machinery as indicated in Brown et al U.S. Pat. No. 3,504,403.

As indicated in FIGS. 5 through 5B, it is the final top parts 16', formed from the preforms 16, which are formed to provide the radially expanded portions 46 at their open ends for the purpose of receiving the peripheral edges or flanges 47 on the bottom sections 15' formed from the preforms 15. As later will become apparent, there is an interference fit peripherally between each flange 47 and peripheral groove or recess 46 such that when the flange 47 is received within the groove 46, and the parts are relatively rotated, a leak-proof friction weld occurs in the manner indicated in Brown et al U.S. Pat. No. Re. 29,448.

The plug-assist type members 48 used in the machine 36 for processing web 12, each comprise a fluid pressure operated cylinder 49, having a plunger rod 50 with a plunger head 51 (see FIG. 5A), when the plunger 51 is extended to the position shown to stretch and molecularly orient side wall 16a at a preferred orientation temperature, it locks the threaded neck portion 16b of the preform 16 in place at the time that high pressure air is entering to radially expand and stretch the body portion 16b. As indicated in FIG. 5B, with the portion 16b firmly locked in position by plunger head 51, the high pressure air admitted through port 52 or alternatively, from a supply incorporated with cylinder 49, further expands the axially stretched side wall 16a to the configuration shown in FIG. 5B. Typically, heated air under a pressure in the neighborhood of 450 p.s.i. may be used.

With the structure disclosed, the integrity and thickness of the threaded portion 16b is maintained, while the side wall 16a is further bi-axially stretched and oriented to increase its rigidity and strength. The process described in FIGS. 5A and 5B is carried out at a temperature well suited to the molecular and crystalline orientation or the particular synthetic plastic material being used. This temperature will be typically somewhat below the thermoforming temperatures previously mentioned. For example, for polyethyleneterephalate, a temperature conducive to substantial molecular orientation is one within the range of about 195° to 212° F. U.S. Pat. No. 3,781,395, and British Pat. No. 921,308, both incorporated herein by reference, set forth temperature ranges that are accepted in the trade, for example, for polypropylene 100° to 160° C., and for polyethylene, 50° to 130° C. The blowing air inserted through port 52 is preferably heated air which cools to near room temperature as a result of adiabatic expansion during the blowing operation and does not therefore drastically chill the material. As indicated, generally speaking, the webs 12 and 12' in the orientation mold mechanism of machines 36 will be at a lesser temperature than when being differential pressure vacuum deformed in the machines 14, to achieve optimum orientation. Because the side wall 16a was initially preconditioned by mechanically compressing it, enhanced strength and rigidity become possible during the orientation steps depicted in FIGS. 5A and 5B.

When the final-formed upper sections 16' leave the orienting machine 36, they proceed to a trim press TP which punches them from web 12 and, at the same time, punches an opening 53 (see FIG. 8). Trim presses of a type generally suited to performing such operations are well-known and disclosed in U.S. Pat. No. 4,005,626 and 3,461,760.

In FIGS. 6 through 6B, the mold mechanism used in the processing line for web 12' (in the machine 36), as will be noted, is quite similar to the mold mechanism shown in FIG. 5. The upper mold 54 is not, however, a split partible mold and each mold cavity for receiving a parison of reduced size relative to it, includes a peripheral portion 54a, an inversely conical bottom portion 54b, and a groove 54c for forming the flange part 47. The lower mold 55, likewise has a sealing ring 56 around each mold opening 55a, disposed in a groove 57, which mates with an annular groove 58 formed in the lower end of upper mold 54. When the upper and lower molds 54 and 55 are in closed position, the seal ring 56 engages with the ring 32 preformed in web 12' to achieve an air sealed lock.

As in the FIGS. 5–5B mold structure, each plug assist member, generally indicated at 59, comprises a cylinder 60 having a plunger head 61 mounted on an extendible rod 62, and similarly, air pressure can be supplied via ports 63 (or via cylinder 60) connected with a source of high pressure heated air in the manner previously described.

As FIGS. 6A and 6B indicate, the plunger 61 axially stretches and orients side wall 15b at a temperature conducive to molecular and crystalline orientation and locks the central portion 15a of the preform against the apex of mold surface 54b, at the time that air pressure is introduced to air ports 63, or in some other suitable manner. It is the high pressure air, i.e. under a pressure in the neighborhood of 450 p.s.i., which expands the axially stretched preform 15 then to the shape 15' of the cavity 54a–54b and achieves a final bi-axial orientation.

As indicated in FIG. 6A, there is an initial molecular stretching of the preform side wall with the extension of cylinder piston rod 62, and then the final bi-axial orientation takes place with further radial and axial expansion of the preform 15 to the final shape 15'. Again, because the preform 15 has been preconditioned by mechanically squeezing it at the time of formation of preform 15, an enhanced strength and rigidity is possible in subsequent orientation steps illustrated in FIGS. 6A and 6B. As with preforms 16, the FIGS. 6A–6B steps are followed with the web 12' at a temperature conducive to material orientation as mentioned.

In the line for web 12', the final forms 15' move in web 12' from the orientation machinery 36, to the trim press TP which punches the final shapes 15' from web 12'. As indicated earlier, each trimmed out, final bottom form 15' is then reversed end-for-end and moved up into interfitting relation with a final top form 16'. The interfitting parts 15', 16' then are friction welded to form a complete container which has great hoop strength.

It is to be understood the container formed could be a three piece container with parts 15' and 16' friction welded to opposite ends of a cylindrical extruded tube.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In a method of forming thin-walled, hollow carbonated beverage and like containers from a thin-walled thermoplastic, synthetic plastic web material, the steps of:
   a. forming a plurality of first preforms having neck portions and also open ended body portions with peripheral axial side walls in an incrementally advanced heated thermoplastic web of said material by differential pressure deformation of said material from the plane of the web into forming mold cavities having peripheral axially extending side walls at a temperature conducive to forming while applying squeezing pressure in each cavity to at least the side wall of the body portion of each first preform with a plug assist of the configuration of the cavity to forge the side wall material against the surface of the cavity and precondition it for subsequent stretching;
   b. forming a plurality of second preforms having open ended body portions with peripheral axial side walls in a second incrementally advanced heated thermoplastic web of plastic material by differential pressure deformation of said material from the plane of the web into forming mold cavities at a temperature conducive to forming while applying squeezing pressure in each cavity to at least the side wall of the body portion of each second preform with a plug assist of the configuration of the cavity to forge the side wall material against the surface of the cavity and precondition it for subsequent stretching;
   c. moving preforms from the mold cavities to enlarged orientation cavities of greater axial length and radial girth than the preforms and receiving them therein in a heated state at a temperature conducive to orientation and stretching the side walls of the body portions of the preforms radially and axially to biaxially orient them and expand them to the orientation cavity size;
   d. trimming the expanded preforms from the webs; and
   e. peripherally welding the open ends of the body portions of the trimmed first and second expanded preforms to form leak-proof products, each comprising a first and second expanded preform.

2. The method of claim 1 in which the first preforms are first stretched axially and then radially during the stretching step and in which each mold cavity for the first preforms includes a neck forming part more remote from the web than the body portion, the neck part of each first preform being locked against the orientation cavity during the step of radial differential stretching of the first preforms so that the radial stretching occurs in the body portions of the first preforms.

3. The method of claim 2 in which the neck-forming portion of each mold cavity for forming a first preform has helical thread grooves for forming external threads on the preform neck portion, and the web material is pressure squeezed into said thread grooves, the grooves being provided in a separable mold section which can be rotated and separated from the mold section for forming the body portion of each first preform.

4. The method said forth in claim 1 wherein axial stretching of the second preform occurs before radial stretching and a central portion of the axial end of each second preform is locked against the orientation cavity before substantial radial stretching occurs.

5. A method of forming thin-walled, hollow, synthetic plastic carbonated beverage containers and like articles using a pair of first shallow and second deeper sets of female molds arranged in series comprising the steps of:

providing a pair of thin, heated, deformable synthetic plastic webs in a thermoplastic state;

stretching spaced apart areas of each web out of the plane of each web into elongate closed end bottom and top preforms which engage and conform to the first sets of shallow molds;

while the preforms remain in the webs in a heated deformable state and engaging the mold walls, compressing stretched side wall portions of said preforms against the molds to forge the molecular and crystalline structure thereof;

cooling the preforms below an orientation temperature to set their configuration and state of compression;

reheating the preforms to a temperature conducive to orientation of the molecular and crystalline structure thereof;

then, while the preforms still remain in the webs, axially stretching and radially expanding the compressed portions of the preforms into the second set of deeper molds;

severing the expanded preforms from the webs to provide open ended expanded top preforms; and, interfitting the severed top and bottom preforms axially and friction welding the interfitted portions thereof to unite them.

6. The method of claim 5 in which each of the severed top and bottom preforms has an axial length corresponding to about half the length of the container or article formed.

7. The method of claim 6 in which said webs are in the range of about 60 to 70 mils in thickness and the bottle side wall portions are on the order of about 10 to 25 mils in thickness.

8. A method of forming thin-walled, synthetic plastic containers and like articles in planar webs of such synthetic plastic material in apparatus which includes first shallow and second deeper sets of molds in series, comprising the steps of:

providing a first heated deformable web of thermoplastic synthetic plastic material;

in the first set of molds stretching areas of said material out of the plane of the material into the molds a portion of the axial length of the containers or articles to be formed to form top preforms each with an open and a closed end;

providing a second heated deformable web of thermoplastic synthetic plastic material;

stretching areas of said material out of the plane of the material a second portion of the axial length of the containers or articles to be formed to form bottom preforms therein, each with an open end and a closed end;

cooling the preforms below orientation temperature to set them, and indexing them to the second set of deeper molds;

reheating the preforms to a temperature conducive to orientation of the molecular and crystalline structure of the material before they reach the second set of molds;

while the preforms are still in the webs further axially stretching the preforms, at said temperature to a greater length still less than the axial length of the container or article to be formed;

then, while the preforms are in the webs, expanding the preforms radially at an orientation temperature to the girth of the bottle to be formed;

severing the stretched preforms from the webs to provide open ended top and bottom sections; and assembling and welding together the open ends of pairs of top and bottom preforms to form the containers or articles.

9. The method of claim 8 in which, immediately after the step of first stretching areas of material out of the plane of the webs, the side walls of the preforms are peripherally compressed in the range of about $1\frac{1}{2}$ to 2 percent.

10. A method of forming thin-walled, hollow, synthetic plastic containers of substantial axial length for use as carbonated beverage containers, and like articles using a pair of first and second sets of shallow and deeper female molds respectively, arranged in series comprising the steps of:

providing a pair of thin, heated, deformable synthetic plastic webs heated to a thermoplastic state;

after forming peripheral locking recesses to peripherally lock their outer edges in position, stretching spaced apart peripherally locked areas of each web out of the plane of each web into elongate closed end bottom and top preforms which engage and conform to the first sets of shallow molds;

while the preforms remain in the webs in said heated deformable state and engaging the mold walls, compressing the stretched side wall portions of said preforms to forge the molecular and crystalline structure thereof;

cooling the preforms below an orientation temperature to set their configuration and state of compression and peripherally unlocking the said peripherally locked areas;

reheating the preforms to a temperature conducive to orientation of the molecular and crystalline structure thereof and indexing the webs to move the preforms to the second sets of deeper molds;

using said peripheral locking recesses to again lock the peripheral outer edges of said areas;

then, while the preforms still remain in the webs, axially stretching and radially expanding the compressed portions of the preforms to cause them to engage and conform to the second sets of deeper molds;

peripherally unlocking the said peripherally locked areas and severing the preforms from the webs to provide open ended top preforms and bottom preforms; and interfitting the severed top and bottom preforms axially and friction welding the interfitted portions thereof to unite them.

* * * * *